United States Patent
Boote et al.

(10) Patent No.: US 8,893,652 B2
(45) Date of Patent: *Nov. 25, 2014

(54) ANIMAL BEDDING AND ASSOCIATED METHOD FOR PREPARING THE SAME

(71) Applicant: CCD Holdings LLC, Holland, MI (US)

(72) Inventors: Carey J. Boote, Holland, MI (US); Russ Malek, Grand Rapids, MI (US)

(73) Assignee: CCD Holdings LLC, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,293

(22) Filed: Jun. 3, 2014

(65) Prior Publication Data

US 2014/0261210 A1 Sep. 18, 2014

Related U.S. Application Data

(63) Continuation of application No. 13/427,511, filed on Mar. 22, 2012, now Pat. No. 8,757,092.

(60) Provisional application No. 61/466,301, filed on Mar. 22, 2011.

(51) Int. Cl.
*A01K 1/015* (2006.01)
*B27N 5/00* (2006.01)
*C09K 3/00* (2006.01)

(52) U.S. Cl.
CPC .................................... *A01K 1/0155* (2013.01)
USPC .......... 119/28.5; 119/171; 252/184; 252/194; 252/190; 435/277; 264/109

(58) Field of Classification Search
CPC .......................... A01K 1/0152; A01K 1/0155
USPC ................. 252/184, 194, 190; 119/28.5, 171; 435/277; 264/109

See application file for complete search history.

(56) References Cited

U.S. PATENT DOCUMENTS

| | | | |
|---|---|---|---|
| 2,708,418 A | 5/1955 | Sugarman et al. | |
| 4,458,629 A | 7/1984 | Gerber | |
| 4,609,431 A | 9/1986 | Grose et al. | |
| 5,054,434 A | 10/1991 | Wax et al. | |
| 5,637,312 A * | 6/1997 | Tock et al. | 424/438 |
| 6,276,300 B1 | 8/2001 | Lewis, II et al. | |
| 6,386,144 B1 | 5/2002 | Cathey | |
| 6,474,267 B1 | 11/2002 | Padgett | |
| 6,593,277 B2 | 7/2003 | Adamoli, Jr. et al. | |
| 6,619,234 B2 | 9/2003 | Sourek, Jr. | |
| 6,698,380 B2 | 3/2004 | Morrison | |
| 6,742,478 B1 | 6/2004 | Davis | |
| 6,991,783 B2 | 1/2006 | Santoiemmo | |
| 7,357,946 B2 | 4/2008 | Adamoli, Jr. et al. | |
| 7,617,798 B2 | 11/2009 | Stevenson | |
| 7,708,214 B2 | 5/2010 | Medoff | |
| 7,727,355 B2 | 6/2010 | Goto et al. | |

(Continued)

*Primary Examiner* — Joseph D Anthony
(74) *Attorney, Agent, or Firm* — King & Partners, PLC

(57) ABSTRACT

Animal bedding having one or more solvents and a lignocellulosic fiber, wherein the lignocellulosic fiber has been processed by ruminant digestion and anaerobic digestion. A method for preparing pelletized animal bedding is also disclosed including the steps of providing excrement from a cow which has undergone ruminant digestion, introducing the cow excrement into an anaerobic digester, modifying the cow excrement to a first wet product, drying the first wet product to generate a first dry product, and densifying the first dry product to, in turn, generate pelletized animal bedding.

20 Claims, 2 Drawing Sheets

(56) References Cited

U.S. PATENT DOCUMENTS

| | | |
|---|---|---|
| 7,905,987 B2 | 3/2011 | Kennedy |
| 7,909,995 B2 * | 3/2011 | Jiang et al. .................... 210/206 |
| 8,012,312 B2 | 9/2011 | Goto et al. |
| 8,757,092 B2 * | 6/2014 | Boote et al. .................. 119/28.5 |
| 8,765,010 B2 * | 7/2014 | Boote et al. .................. 119/28.5 |
| 2008/0035036 A1 * | 2/2008 | Bassani et al. ................ 110/224 |
| 2009/0036566 A1 | 2/2009 | Li et al. |
| 2009/0206028 A1 * | 8/2009 | Jiang et al. .................... 210/603 |
| 2012/0285384 A1 * | 11/2012 | Boote et al. .................. 119/28.5 |
| 2013/0126781 A1 * | 5/2013 | Boote et al. .................. 252/184 |

* cited by examiner

ANIMAL BEDDING AND ASSOCIATED METHOD FOR PREPARING THE SAME

CROSS-REFERENCE TO RELATED APPLICATIONS

This application is a continuation of U.S. application Ser. No. 13/427,511, filed Mar. 22, 2012, now U.S. Pat. No. 8,757,092 B2, entitled "Animal Bedding and Associated Method for Preparing the Same," which claims the benefit of U.S. Provisional Application Ser. No. 61/466,301, filed Mar. 22, 2011, entitled "Fibrous Materials and Associated Methods for Using the Same," which are hereby incorporated herein by reference in their entirety, including all references cited therein.

BACKGROUND OF THE INVENTION

1. Field of the Invention

The present invention relates in general to animal bedding and, more particularly, to animal bedding (e.g., horse bedding, etceteras) which comprises lignocellulosic fiber which has been processed by ruminant digestion and anaerobic digestion. The animal bedding and associated methods of the present invention are environmentally beneficial because they convert waste to resources, reduce air and water pollution, and directly contribute to the procurement of sustainable biological systems.

Animal bedding products have been known in the art for years and are the subject of a plurality of publications and patents including: U.S. Pat. No. 2,708,418 entitled "Animal Bedding," U.S. Pat. No. 4,458,629 entitled "Litter for Mammals and Fowl," U.S. Pat. No. 5,054,434 entitled "Suppression of Ammonia Odors from Animal Wastes," U.S. Pat. No. 6,276,300 entitled "Animal Litter," U.S. Pat. No. 6,386,144 entitled "Method of Manufacturing Absorbent Material for Conversion to Fertilizer," U.S. Pat. No. 6,474,267 entitled "Pelletized Animal Bedding and Process and Tool for Sifting Manure Therefrom," U.S. Pat. No. 6,619,234 entitled "Absorbent Compacted Composition," U.S. Pat. No. 6,698,380 entitled "Animal Bed from Cottonseed," U.S. Pat. No. 6,991,783 entitled "Absorbent, Deodorizing, Hygienic Animal Bedding Composition and Method of Manufacture," and U.S. Pat. No. 7,617,798 entitled "Animal Bedding Additive and Animal Bedding Containing the Same," all of which are hereby incorporated herein by reference in their entirety—including all references cited therein.

U.S. Pat. No. 2,708,418 appears to disclose bedding material for poultry and animals adapted particularly to absorb liquids and other excrement. The bedding material is manufactured from paper pulp, and preferably small pieces of paper pulp adapted to absorb rapidly any liquid resulting from animal excrement.

U.S. Pat. No. 4,458,629 appears to disclose pelletized mammal or fowl litter, particularly useful for domestic pets and laboratory animals. The litter provides a highly absorbent, antibacterial, antifungal and odor control bedding which is composed of defibered cellulosic materials mixed with chemicals, obtaining properties described therein. The composition which is chemically of a basic pH is compressed into pellet form to provide improved handling and antitracking qualities.

U.S. Pat. No. 5,054,434 appears to disclose one solution to the accumulation of gaseous ammonia in areas wherein animals are housed or maintained by providing to the areas animal litter, bedding, or other absorbent material which contain a low molecular weight, non-volatile organic acid. Acids such as citric, malic, fumaric, phosphoric, tartaric, maleic, malonic, succinic, sorbic and mixtures of these acids are used and especially phosphoric and fumaric. These acids can be used in concentrations of about 0.0001 to 2 weight % of the dry bedding.

U.S. Pat. No. 6,276,300 appears to disclose a litter composition including paper, sawdust, and zeolite molecular sieve. The composition is formed into pellets or discs having a size, soil-like consistency, and texture which is believed to be attractive to dogs. In addition, the litter has a high degree of absorption and odor control. The litter composition may further include sphagnum moss to provide additional absorbency.

U.S. Pat. No. 6,386,144 appears to disclose a method of producing an organic fertilizer from a highly absorbent animal bedding material manufactured from recycled waste paper, cotton fiber, cotton gin waste, and gypsum. The recycled waste products are combined to form a slurry mixture for processing by conventional paper making machinery into sheet material. Various chemical additives are admixed to the slurry mixture to control bacterial growth in the bedding material. The sheet material is further processed into sized particles to provide an animal bedding such as poultry litter. After the highly absorbent material is saturated with nutrient-rich animal excrement, it is subjected to chemical analysis and further processed to provide a biodegradable, organic fertilizer. The absorbent bedding material has alternative uses such as for collection of liquid chemical spills and for the remediation of such spills by biodegradation. The converted organic fertilizer can also be used as a ruminant feed after chemical analysis and the elimination of harmful microorganisms.

U.S. Pat. No. 6,474,267 appears to disclose an animal bedding material consisting of compacted and compressed pelletized sawdust particles or granules of relatively uniform size by a pellet fork specifically designed to enable the pellets or particles to sift through the tines of the fork while retaining all but the tiniest particles of manure atop the tines for disposal. The pellet fork is uniquely and specifically designed to provide an improved sifting function not previously possible with other bedding materials except when using a mechanized sifter, resulting in substantial material and labor cost savings, longer life and easier maintenance of bedding, reduction of cleaning time per stall, improved cleanliness of stalls and attendant improved health of the animals. The volume of waste and bedding removed from a horse stall during cleaning may reduce a manure pile as much as 70% compared to conventional use of straw.

U.S. Pat. No. 6,619,234 appears to disclose an absorbent compacted composition which consists essentially of clay, a finely divided cellulosic material, such as fir, and finely divided pine. The amount of finely divided cellulosic material and finely divided pine is enough to bind the composition into a compacted form without additional binders or water addition. Also, the amount of pine is sufficient to reduce the friction heat during compaction to no greater than about 200 degrees Fahrenheit.

U.S. Pat. No. 6,698,380 appears to disclose a method for improving the comfort, health, and grooming of an animal by providing a bedding material made of cottonseeds. A fragrance and/or a pesticide may be added to the cottonseeds.

U.S. Pat. No. 6,991,783 appears to disclose an animal bedding composition and method of manufacture which includes cut or shredded pieces of multiple panel corrugated cardboard kraft paper structures having an internal corrugated panel sandwiched between outer panels, and an adsorptive deodorizing ion exchange agent such as a zeolite dispersed throughout the cardboard pieces and carried on outer and inner surfaces of the pieces of cardboard and on outer and inner surfaces of the corrugations to provide a comfortable, hygienic and deodorized floor covering for animal stalls. An automated method of manufacturing the animal bedding composition is also described. The ion exchange agent attaches to surfaces of the corrugated cardboard which serves as a carrier to sanitize and deodorize a stall. The open structure of the cut corrugations provides mechanical load absorption, and a wicking action to aerate moisture from a stall. The ion exchange agent carried by the corrugated pieces removes ammonia odor from urine and provides slow release potassium and, when loaded with ammonium, slow release of nitrogen for agricultural fertilization. Carbon in the kraft paper from which the corrugated cardboard is constructed attracts nitrogen from urine, yielding excellent fertilizing material with rapid biodegradation.

U.S. Pat. No. 7,617,798 appears to disclose an animal bedding mixture which includes a bedding material and a bedding material additive. The bedding material is preferably straw, sawdust, sand or recycled manure solids. The bedding material additive is preferably 60-99% by weight absorbent clay powder, 0.1 to 35% by weight chlorite salt, and 0.01-35% by weight sodium bisulfate or sodium percarbonate. The bedding material additive of the present disclosure is inert when dry and neither germicidal or acidic. However, when the additive is exposed to moisture, such as animal urine, the sodium bisulfate will acidify the liquid, causing the formation of hypochlorous acid and chlorine dioxide. Hypochlorous acid and chlorine dioxide are very powerful, broad spectrum germicides that have proven efficacy against *E. coli, Staphylococcus aureus*, and other micro-organisms commonly found in animal bedding.

While animal bedding products have been known in the art for years, issues associated with bedding durability, absorbency, waste, compostability, biodegradability, animal and human health as well as facilitating sustainable biological systems remain largely problematic.

Therefore, it is an object of the present invention to provide an animal bedding product that comprises lignocellulosic fiber which has been processed by ruminant digestion and anaerobic digestion. Such animal bedding converts waste to resources, reduces air and water pollution, and directly contributes to the procurement of sustainable biological systems.

These and other objects of the present invention will become apparent in light of the present specification, claims, and drawings.

SUMMARY OF THE INVENTION

In one embodiment, the present invention is directed to animal bedding, comprising, consisting of and/or consisting essentially of: (a) one or more solvents; and (b) a lignocellulosic fiber, wherein the lignocellulosic fiber has been processed by ruminant digestion and anaerobic digestion.

In a preferred embodiment of the present invention, the one or more solvents comprises water which is preferably present in a concentration of less than approximately 25% by weight.

In another preferred embodiment of the present invention, the one or more solvents are present in a concentration of less than approximately 70% by weight, and more preferably less than approximately 50% weight.

In yet another preferred embodiment of the present invention, the lignocellulosic fiber compromises processed lignin, hemicellulose, and cellulose.

In a preferred embodiment of the present invention, the lignocellulosic fiber is present in a concentration of greater than approximately 40% by weight, and more preferably greater than approximately 50% weight.

In one aspect of the present invention, the density fiber of the animal bedding ranges from approximately 0.950 grams per cubic centimeter to approximately 1.40 grams per cubic centimeter.

In a preferred embodiment of the present invention, the pH of the animal bedding is alkaline and ranges in pH from greater than approximately 8 to less than approximately 10.5.

In another preferred embodiment of the present invention, the average particle size of the lignocellulosic fiber is less than approximately 10 microns.

In one embodiment of the present invention, the animal bedding is pelletized and preferably includes a specific density which ranges from approximately 0.400 grams per cubic centimeter to approximately 0.850 grams per cubic centimeter.

In yet another preferred embodiment of the present invention, the animal bedding further comprises an odor suppressant, such as an organic ester.

Moreover, the animal bedding may further comprise an indictor to inform a user when the animal bedding has been soiled with urine. Non-limiting examples of indicators include 3-amino-7-dimethylamino-2-methylphenazine hydrochloride and 3,3-bis(4-hydroxy-2-methyl-5-propan-2-ylphenyl)-2-benzofuran-1-one.

The present invention is also directed to a method for preparing pelletized animal bedding, comprising the steps of: (a) providing excrement from a cow which has undergone ruminant digestion; (b) introducing the cow excrement into an anaerobic digester; (c) modifying the cow excrement to a first wet product; (d) drying the first wet product to generate a first dry product; and (e) densifying the first dry product to, in turn, generate pelletized animal bedding.

In a preferred embodiment of the present invention, the above-identified method further comprises the step of bleaching the first dry product before the step of densifying the first dry product. It will be understood that regardless of its ordinary meaning, the term "bleaching" will be defined herein as chemical bleaching, color alternating, color lightening, and/or physical separation of colored material.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
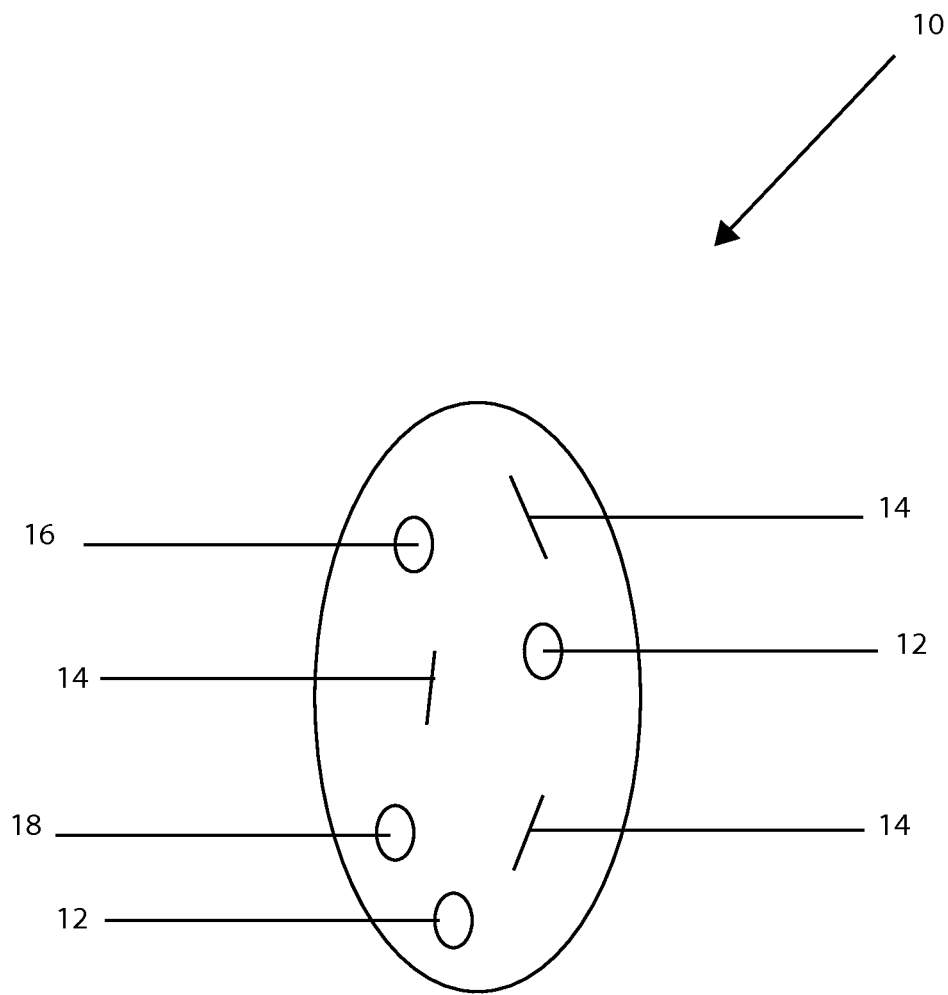
FIG. 1 of the drawings is a cross-sectional view of animal bedding manufactured in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 2:
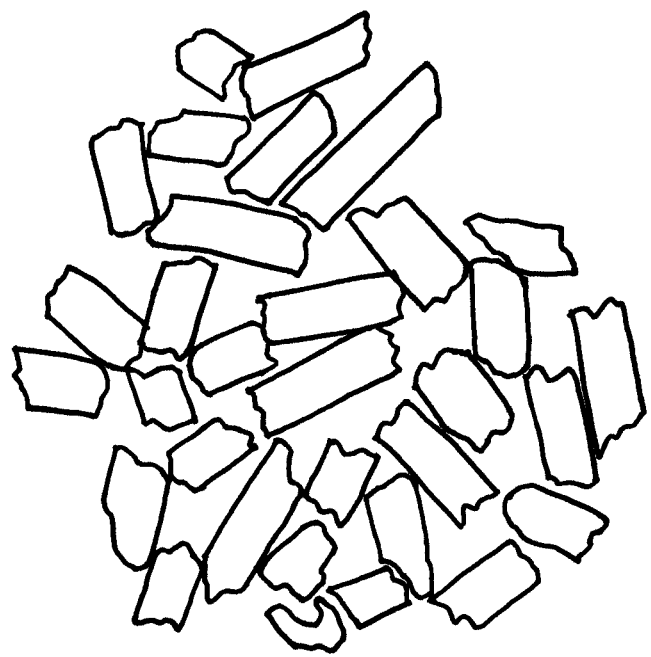
FIG. 2 of the drawings is a perspective view of pelletized animal bedding manufactured in accordance with the present invention.

It will be understood that like or analogous elements and/or components, referred to herein, may be identified throughout the drawings with like reference characters. It will be further understood that one or more of FIGS. 1-2 are merely schematic representations of animal bedding. As such, some of the components have been distorted from their actual scale for pictorial clarity.

In accordance with the present invention, the animal bedding disclosed herein is configured for use in a plurality of applications including, but not limited to, dairy bedding, horse bedding, cat bedding, small animal bedding, etceteras. The animal bedding of the present invention, among other benefits, has substantially longer stall life (i.e., utilization time), reduces store, farm and/or stall management costs, reduces cleaning costs, reduces material disposal costs, reduces veterinary costs, relative to commercially available animal bedding. Moreover, the animal bedding of the present invention is a direct result of the conversion of waste material to a resource which is biodegradable, compostable, and sustainable with respect to biological systems.

Referring now to the drawings and to FIG. 1 in particular, animal bedding 10 is shown which generally comprises one or more solvents 12 and lignocellulosic fiber 14. It will be understood that lignocellulosic fiber 14 has been processed by both ruminant digestion and supplemental anaerobic digestion. In particular, the ruminant digestion typically occurs in a cow or other animal and the supplemental anaerobic digestion occurs in an anaerobic digester which is commercially available from any one of a number or sources, including Pagel's Ponderosa Dairy Farm, Kewaunee, Wis., and Vir-Clar Dairy Farm, Fond du Lac, Wis. It will be understood that sequential ruminant digestion followed by anaerobic digestion chemically and physically alters the original animal excrement into a material having different physical and chemical properties.

One or more solvents 12 of animal bedding 10 preferably comprise water, but other solvents are likewise contemplated for use in accordance with the present invention, including nonpolar solvents (e.g., pentane, hexane, benzene, toluene, chloroform, diethyl ether, etceteras) polar aprotic solvents (e.g., acetone, propylene carbonate, tetrahydrofuran, etceteras) and/or polar protic solvents (e.g., water, methanol, ethanol, isopropanol, acetic acid, formic acid, etceteras). Preferably, the concentration of one or more solvents 12 is less than approximately 70% by weight, and more preferably less than approximately 50% weight. It will be understood that one or more solvents 12 of animal bedding 10 are entrapped into the structure of lignocellulosic fiber 14, which among other things, provides for a sponge-like characteristic, as well as facilitates the initiation of cellular absorption. It will be further understood that one or more solvents 12 of animal bedding 10 facilitates attractive forces, including, but not limited to, Van der Waals forces and/or hydrogen bonding between atoms, molecules, and/or surfaces of lignocellulosic fiber 14—including lignin, hemicellulose, and/or cellulose and fibers of the same—just to name a few.

In one embodiment, lignocellulosic fiber 14 includes a combination of lignin, hemicellulose, and cellulose. However, as will be discussed in greater detail below, lignocellulosic fiber 14 may comprise other materials. After being processed by both ruminant digestion and supplemental anaerobic digestion, the density fiber of animal bedding 10 preferably ranges from approximately 0.950 grams per cubic centimeter to approximately 1.40 grams per cubic centimeter.

Additionally, lignocellulosic fiber 14 of animal bedding 10 is present in a concentration of greater than approximately 40% by weight, and more preferably present in a concentration of greater than approximately 50% by weight.

In one preferred embodiment of the present invention, animal bedding 10 preferably comprises an alkaline pH which ranges from greater than approximately 8 to less than approximately 10.5. However, it will be understood that non-alkaline pH's are contemplated for certain applications.

In another preferred embodiment of the present invention, animal bedding 10 includes lignocellulosic fiber 14 which preferably comprises an average particle size of less than approximately 10 microns.

As is best shown in FIG. 2, in one embodiment of the present invention, animal bedding 10 is pelletized. In this embodiment the specific density of the animal bedding pellets ranges from approximately 0.400 grams per cubic centimeter to approximately 0.850 grams per cubic centimeter.

When animal bedding 10 is in pellet form, one or more solvents 12 are preferably present in a concentration of less than approximately 25% by weight.

Animal bedding 10 may also include odor suppressant 16. Odor suppressant 16 preferably comprises an organic ester to mask urine and/or feces odor, and may also comprise an odor neutralizer which converts urea to a less odoriferous compound.

In accordance with the present invention, animal bedding 10 may also include indicator 18 which visually identifies when animal bedding 10 has been soiled by an animal. Non-limiting examples of indicators 18 include 3-amino-7-dimethylamino-2-methylphenazine hydrochloride and 3,3-bis(4-hydroxy-2-methyl-5-propan-2-ylphenyl)-2-benzofuran-1-one—just to name a few.

The present invention is also directed to a method for preparing pelletized animal bedding, comprising the following steps. First, a ruminant animal (e.g., cow, cattle, goat, sheep, giraffe, bison, moose, elk, yak, water buffalo, deer, camel, alpaca, llama, antelope, pronghorn, nilgai, etceteras) is fed with sufficient quantities of bast and/or bast type fibre from one or more sources including, but not limited to, corn, wheat, etceteras. Second, excrement from the ruminant animal which has undergone ruminant digestion via the animal is obtained. Next, the animal excrement is associated with (e.g., placed in) an anaerobic digester which generates a first wet product. After the first wet product is generated, it is placed into a conventional dryer which generates a first dry product. The first dry product is suitable for use as animal bedding 10, but may also be densified and/or pelletized using conventional techniques (e.g., compression densification and/or pelletization) animal bedding. One commercial source for pelletization is Michigan Wood Fuel Pellets, Holland, Mich. Lastly, the first wet product and/or the first dry product may be bleached or color altered prior to, during, and/or after densifying the first dry product.

The invention is further described by the following example.

Example I

Perfect Cycle™ Natural Bedding, which is commercially available from Eco-composites LLC, Holland, Mich., was placed into a horse stall. On the same day traditional wood shaving bedding was placed into a separate horse stall. After approximately three days of use, the traditional wood shaving bedding was saturated to the point where the horse was showing signs of dissatisfaction with the bedding. However, the Perfect Cycle™ Natural Bedding of the present invention, was still acceptably absorbent after fifteen days and substantial pellet breakdown was not observed until after about 21 days. The Perfect Cycle™ Natural Bedding exhibited a plurality of superior features/characteristics including five times the absorbency and product life compared to traditional wood shaving bedding. Moreover, the odor emanating from the stall with the Perfect Cycle™ Natural Bedding was substantially more acceptable compared to the odor emanating from the stall with the traditional wood shaving bedding. Furthermore, due to, at least in part, the solvent configuration, composition and/or concentration of the Perfect Cycle™ Natural Bedding, the dust observed in the horse stall was substantially reduced compared to the dust observed in the stall with the traditional wood shaving bedding. Lastly, after use, the Perfect Cycle™ Natural Bedding was readily compostable, whereas the traditional wood shaving bedding were required to be disposed of using traditional resources.

The foregoing description merely explains and illustrates the invention and the invention is not limited thereto except insofar as the appended claims are so limited, as those skilled in the art who have the disclosure before them will be able to make modifications without departing the scope of the invention.

What is claimed and desired to be secured by Letters Patent of the United States is:

1. Animal bedding, comprising:
   at least one solvent, wherein the at least one solvent comprises water and is present in a concentration of less than approximately 25% weight;
   a lignocellulosic fiber, wherein the lignocellulosic fiber compromises processed lignin, hemicellulose, and cellulose, and wherein the lignocellulosic fiber has been processed by ruminant digestion and anaerobic digestion; and
   wherein the density fiber of the animal bedding ranges from approximately 0.950 grams per cubic centimeter to approximately 1.40 grams per cubic centimeter.

2. The animal bedding according to claim 1, wherein the pH of the animal bedding is alkaline.

3. The animal bedding according to claim 2, wherein the pH of the animal bedding ranges from greater than approximately 8 to less than approximately 10.5.

4. The animal bedding according to claim 3, wherein the average particle size of the lignocellulosic fiber is less than approximately 10 microns.

5. The animal bedding according to claim 4, wherein the animal bedding is pelletized.

6. The animal bedding according to claim 5, wherein the specific density of the animal bedding pellets ranges from approximately 0.400 grams per cubic centimeter to approximately 0.850 grams per cubic centimeter.

7. The animal bedding according to claim 6, further comprising an odor suppressant.

8. The animal bedding according to claim 7, wherein the odor suppressant comprises an organic ester.

9. The animal bedding according to claim 6, further comprising 3-amino-7-dimethylamino-2-methylphenazine hydrochloride.

10. The animal bedding according to claim 6, further comprising 3,3-bis(4-hydroxy-2-methyl-5-propan-2-ylphenyl)-2-benzofuran-1-one.

11. The animal bedding according to claim 6, wherein the lignocellulosic fiber is present in a concentration of greater than approximately 40% by weight.

12. The animal bedding according to claim 6, wherein the lignocellulosic fiber is present in a concentration of greater than approximately 50% by weight.

13. Animal bedding, comprising:
    at least one solvent, wherein the at least one solvent comprises water present in a concentration of less than approximately 70% weight;
    a lignocellulosic fiber, wherein the lignocellulosic fiber has been processed by ruminant digestion and anaerobic digestion; and
    wherein the density fiber of the animal bedding ranges from approximately 0.950 grams per cubic centimeter to approximately 1.40 grams per cubic centimeter.

14. The animal bedding according to claim 13, wherein the pH of the animal bedding ranges from greater than approximately 8 to less than approximately 10.5.

15. The animal bedding according to claim 14, wherein the average particle size of the lignocellulosic fiber is less than approximately 10 microns.

16. The animal bedding according to claim 15, wherein the specific density of the animal bedding pellets ranges from approximately 0.400 grams per cubic centimeter to approximately 0.850 grams per cubic centimeter.

17. The animal bedding according to claim 16, wherein the lignocellulosic fiber is present in a concentration of greater than approximately 40% by weight.

18. The animal bedding according to claim 17, wherein the lignocellulosic fiber is present in a concentration of greater than approximately 50% by weight.

19. Animal bedding, comprising:
    at least one solvent, wherein the at least one solvent comprises water present in a concentration of less than approximately 50% weight;
    a lignocellulosic fiber, wherein the lignocellulosic fiber has been processed by ruminant digestion and anaerobic digestion; and
    wherein the density fiber of the animal bedding ranges from approximately 0.950 grams per cubic centimeter to approximately 1.40 grams per cubic centimeter.

20. The animal bedding according to claim 19, wherein the lignocellulosic fiber is present in a concentration of greater than approximately 50% by weight.

* * * * *